US011948342B2

(12) United States Patent
Yamanaka

(10) Patent No.: US 11,948,342 B2
(45) Date of Patent: Apr. 2, 2024

(54) IMAGE PROCESSING APPARATUS, IMAGE PROCESSING METHOD, AND NON-TRANSITORY STORAGE MEDIUM FOR DETERMINING EXTRACTION TARGET PIXEL

(71) Applicant: CANON KABUSHIKI KAISHA, Tokyo (JP)

(72) Inventor: Satoru Yamanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/364,015

(22) Filed: Jun. 30, 2021

(65) Prior Publication Data
US 2022/0004795 A1    Jan. 6, 2022

(30) Foreign Application Priority Data
Jul. 6, 2020  (JP) ................. 2020-116595

(51) Int. Cl.
*G06V 10/00* (2022.01)
*G06V 10/26* (2022.01)
*G06V 30/148* (2022.01)
*G06V 30/10* (2022.01)

(52) U.S. Cl.
CPC .......... *G06V 10/273* (2022.01); *G06V 30/155* (2022.01); *G06V 30/10* (2022.01)

(58) Field of Classification Search
CPC ........ G06V 10/28; G06V 10/60; G06V 30/10; G06V 30/155; G06V 10/273; G06V 20/62; G06V 30/40; G06V 30/1478; G06T 7/136
See application file for complete search history.

(56) References Cited

U.S. PATENT DOCUMENTS

| 2009/0003700 A1* | 1/2009 | Xiao | G06V 30/155 382/176 |
| 2009/0220154 A1* | 9/2009 | Daidoh | G06V 30/155 382/182 |
| 2014/0043659 A1* | 2/2014 | Kawakami | G06V 10/95 358/470 |
| 2018/0089835 A1* | 3/2018 | Honda | G06T 7/136 |
| 2018/0268212 A1* | 9/2018 | Kubota | G06V 30/412 |
| 2019/0333211 A1* | 10/2019 | Johansson | G06V 20/69 |
| 2020/0175308 A1* | 6/2020 | Sakai | G06V 10/273 |
| 2021/0081660 A1* | 3/2021 | Okada | G06V 30/416 |
| 2021/0192695 A1* | 6/2021 | Kosaka | H04N 1/387 |

FOREIGN PATENT DOCUMENTS

JP    2019159420 A    9/2019

* cited by examiner

*Primary Examiner* — Molly Wilburn
*Assistant Examiner* — Ahmed A Nasher
(74) *Attorney, Agent, or Firm* — CANON U.S.A., INC. IP Division

(57) ABSTRACT

A first binary image is generated by binarizing an input image based on a threshold, a second binary image is generated by changing a pixel that has predetermined high luminance in the input image into a black pixel, and whether a black pixel cluster in the second binary image is made to be an extraction target is determined based on a position of a character image identified based on a black pixel cluster in the first binary image, and a position of the black pixel cluster in the second binary image.

6 Claims, 11 Drawing Sheets

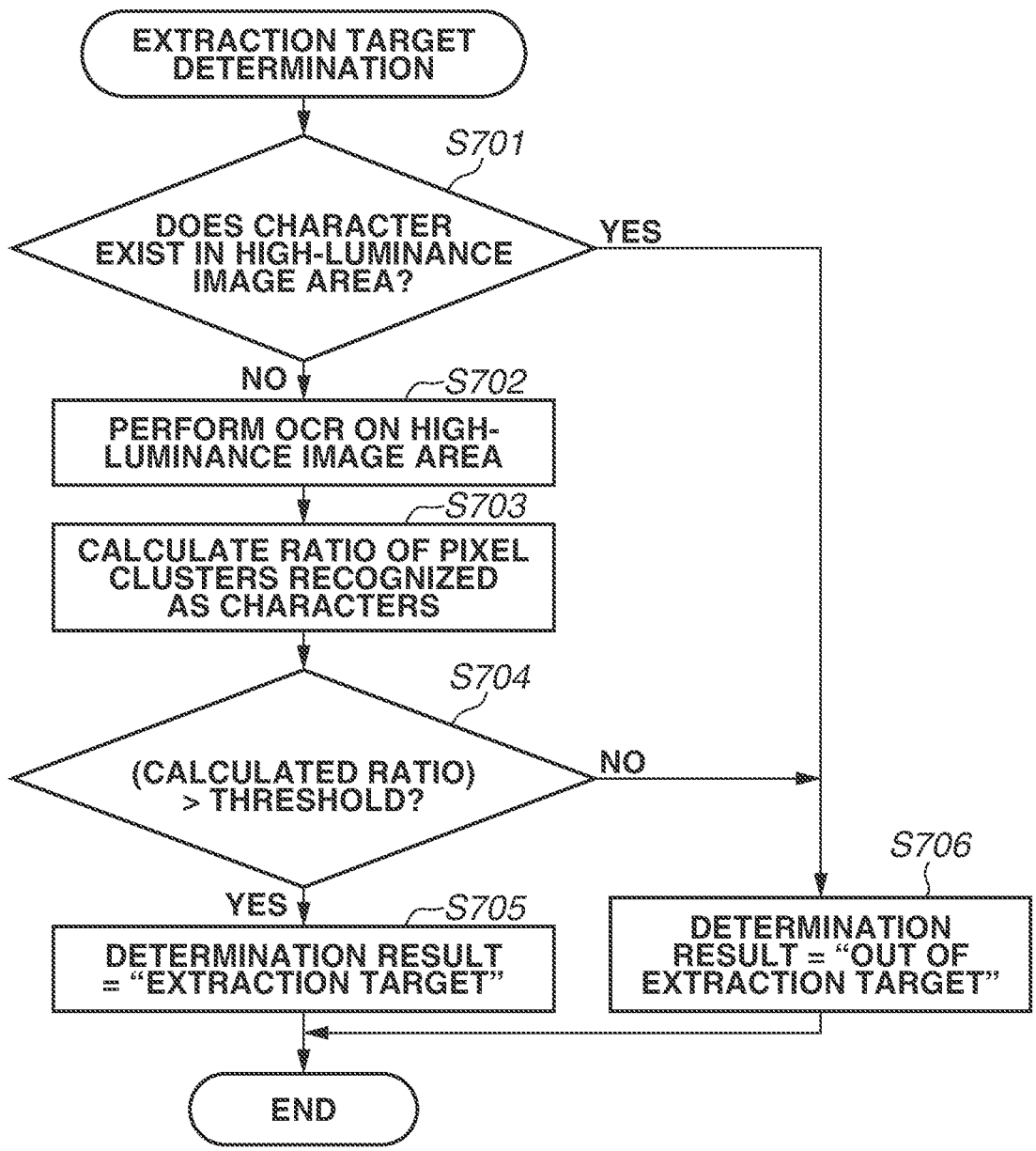

IMAGE PROCESSING APPARATUS, IMAGE PROCESSING METHOD, AND NON-TRANSITORY STORAGE MEDIUM FOR DETERMINING EXTRACTION TARGET PIXEL

BACKGROUND

Field

The present disclosure relates to an image processing apparatus, a method, and a storage medium that determine whether a high-luminance pixel in an input image will be made to be an extraction target.

Description of the Related Art

To make accounting work and the like efficient, a system is being developed that uses optical character recognition (hereinafter referred to as OCR) processing technique to extract character information from a business form image scanned with a scanner, and to recognize the character information. Further, a function that extracts particular items (hereinafter referred to as Keys), such as a date, on the basis of an OCR result of a business form image, and estimates and obtains a value (hereinafter referred to as a Value) that corresponds to each of the Keys by using information, such as a character form, (hereinafter referred to as Key-Value extraction function) is generally known.

Some business form images may contain characters described with colors that have high luminance (colors that have high brightness). In a case where these characters are Keys or Values, a conventional character recognition system may fail to perform Key-Value extraction. For example, a general method for recognizing characters in a scanned image includes converting the image into a monochrome binary image on the basis of a threshold calculated from a luminance value of the whole image, and displaying black character images and a white background image. However, characters that have luminance values that are larger than the threshold assimilate into a background. Therefore, the characters cannot be recognized as characters.

In Japanese Patent Application Laid-Open No. 2019-159420, a character area is extracted on the basis of a first binary image obtained by binarizing a scanned image with a first threshold, a second binary image is obtained by binarizing again a background area that is not the character area with a second threshold, and thus characters that have colors that have high brightness are extracted.

When a business form on which duplex printing has been performed is scanned with a scanner, a phenomenon "show-through" that characters and pictures on the back side show through in a scanned image occurs in same cases. Objects, such as characters and pictures, that show through due to show-through, often exist as objects that have colors that are lighter than colors of character images on the front side (that is to say, objects that have high brightness or luminance), in a scanned image. If a technique as discussed in Japanese Patent Application Laid-Open No. 2019-159420, is applied to such a scanned image, back-side objects that have shown through are extracted as a binary image, in addition to character images that have high brightness (luminance).

In a case where a pair of a Key and a Value is extracted from a scanned image, a positional relationship between a character string that is the Key and a character string that is the Value is generally considered. For example, in some cases, a character string that exists on the right relative to a character string that is a Key is extracted as a Value. In a case where such processing described above that extracts objects, such as character strings, that have high brightness is applied to a scanned image, a back-side object that has shown through and has been binarized may show between a character string that is a Key and a character string that is a Value. In such a case, a back-side object that shows through exists on the right relative to a character string that is a Key. Therefore, an original pair of a Key and a Value is not extracted.

SUMMARY

According to an aspect of the embodiments, an apparatus includes at least one memory that stores instructions, and at least one processor that executes the instructions to perform generating a first binary image by binarizing an input image based on a threshold, generating a second binary image by changing a pixel that has predetermined high luminance in the input image into a black pixel, and determining whether a black pixel cluster in the second binary image is made to be an extraction target, based on a position of a character image identified based on a black pixel cluster in the first binary image, and a position of the black pixel cluster in the second binary image.

Further features of the present disclosure will become apparent from the following description of exemplary embodiments with reference to the attached drawings.

BRIEF DESCRIPTION OF THE DRAWINGS

FIG. 7A is a flowchart that illustrates extraction target determination processing according to a third exemplary embodiment.

DESCRIPTION OF THE EMBODIMENTS

Figure 1:
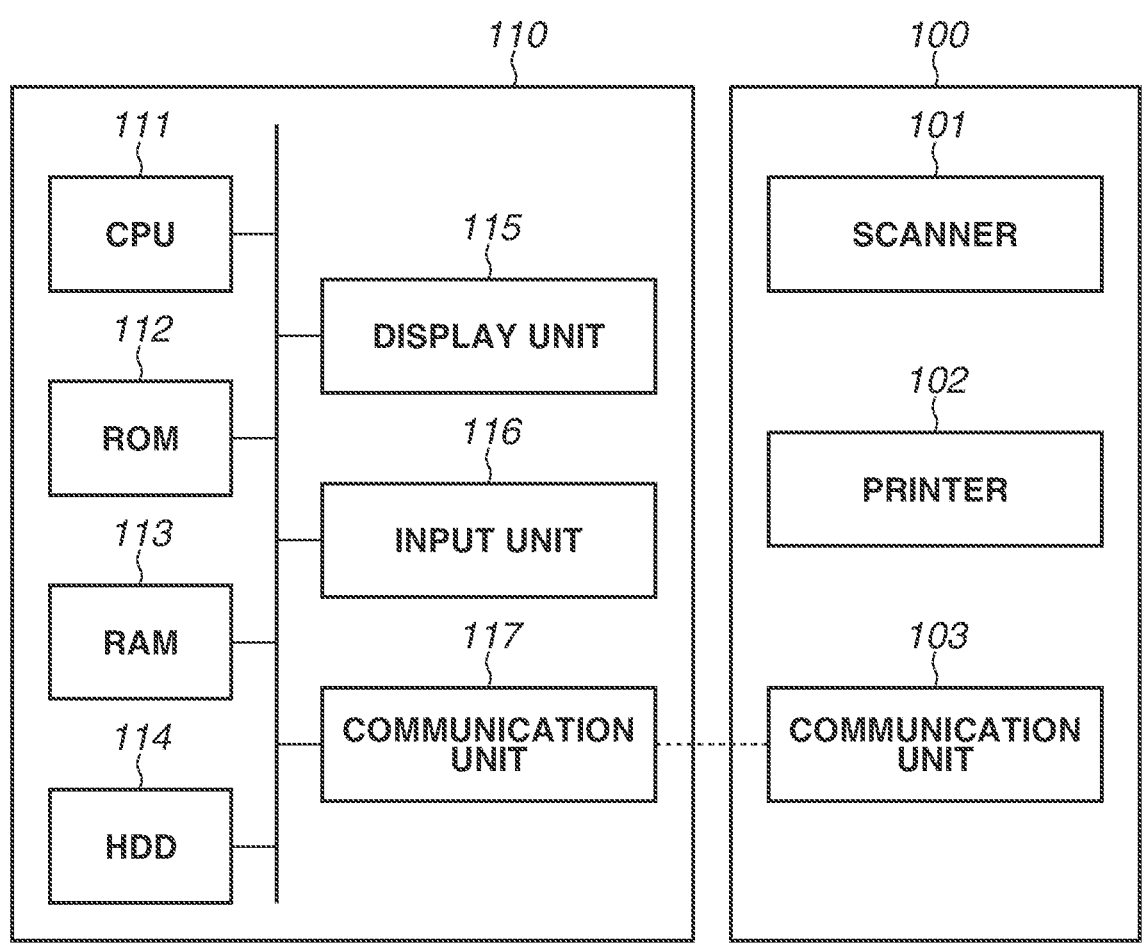
FIG. 1 illustrates an information processing system according to a first exemplary embodiment.

FIG. 1 illustrates an information processing system according to a first exemplary embodiment. The information processing system includes a copy machine (multi-function peripheral) 100 and an information processing device 110. The multi-function peripheral 100 includes a scanner 101, a printer 102, and a communication unit 103. The scanner 101 scans a document and generates a scanned image. The printer 102 prints an image on paper (forms an image). The communication unit 103 of the copy machine 100 communicates with external apparatuses through a network.

The information processing device 110 includes a central processing unit (CPU) 111, a read-only memory (ROM) 112, a random-access memory (RAM) 113, a hard disk drive (HDD) 114, a display unit 115, an input unit 116, and an information processing device-side communication unit 117. The CPU 111 reads and executes control programs stored in the ROM 112 or the HDD 114, and thus functions as a processing unit that performs various kinds of processing illustrated in flowcharts described below. The RAM 113 is used as a temporarily storage area, such as a main memory of the CPU 111, and a working area. The HDD 114 stores various kinds of data, various programs, and the like. That is to say, functions and processing of the information processing device 110 are implemented by the CPU 111 reading and executing programs stored in the ROM 112 or the HDD 114.

The communication unit 117 of the information processing device 110 communicates with external apparatuses through a network. The display unit 115 is a display or a projector that displays various kinds of information. The input unit 116 includes a keyboard and a mouse, and receives various operations by a user. The display unit 115 and the input unit 116 may be integrated into a touch panel, for example.

In the present exemplary embodiment, the copy machine 100 scans a document, such as a business form, with the scanner 101, and generates an input image. Then the input image is transmitted to the information processing device 110 through the communication unit 103. The information processing device 110 receives the input image through the communication unit 117, and stores the input image in a storage unit, such as the HDD 114.

Figure 2:
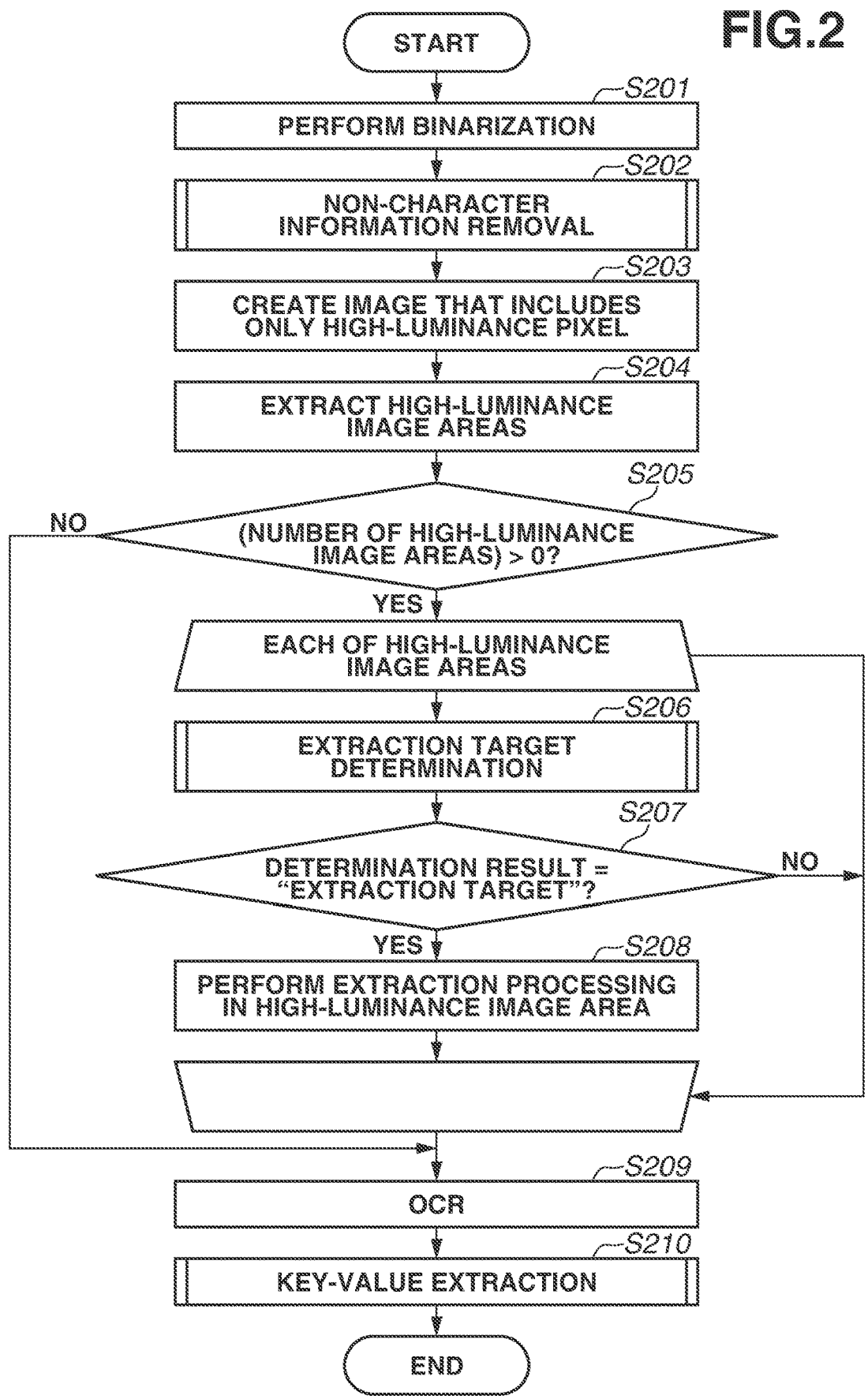
FIG. 2 is a flowchart that illustrates processing that is from binarization to Key-Value extraction, and is according to the first exemplary embodiment.

FIG. 2 is a flowchart that illustrates a series of processing according to the first exemplary embodiment.

In step S201, the CPU 111 processes an input image received from the copy machine 100 with binarization processing to generate a binary image, and stores the binary image in the RAM 113. The binarization processing is processing that converts tones of an image into two tones of white and black. For example, the binarization processing converts an input image into a luminance image, and compares the luminance of each pixel in the luminance image with a first threshold VTH. The binarization processing makes a pixel that has luminance that is lower than the threshold VTH a black pixel. The binarization processing makes a pixel that has luminance that is higher than the threshold VTH a white pixel. A threshold used for the binarization processing may be determined with, for example, a method that determines the threshold on the basis of a histogram of a whole image. Alternatively, a threshold used for the binarization processing may be determined with another method.

In step S202, the CPU 111 classifies the black pixels in the binary image into character image pixels or into non-character image pixels, and removes the black pixels that have been determined to be non-character image pixels from the binary image (that is to say, replaces the black pixels that have been determined to be non-character image pixels with white pixels). The binary image from which the non-character images have been removed contains character images, and is an image suitable for optical character recognition (OCR) processing (character recognition processing) in step S209 described below (an image from which non-character images have been removed). In step S202, positions of character images (positions of character areas) may also be identified.

Figure 3:
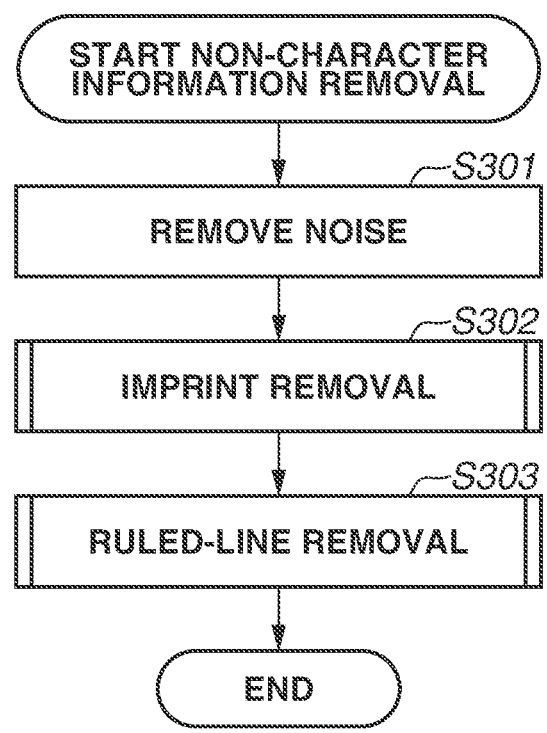
FIG. 3 is a flowchart that illustrates non-character image removal processing according to the first exemplary embodiment.

FIG. 3 is a flowchart that illustrates non-character image removal processing. Noise removal processing (step S301), imprint removal processing (step S302), and ruled-line removal processing (step S303) are performed. An order of the noise removal processing, the imprint removal processing, and the ruled-line removal processing is not limited to the order in FIG. 3, but the processing may be performed in another different order. In a case where an input image contains non-character information that is not noise, an imprint, or ruled lines (a picture, an illustration, or the like), processing that removes non-character images of the non-character information may be added.

In step S301, in the noise removal processing, for example, black pixels that connect with each other are detected as black pixel clusters. Among the detected black pixel clusters, it is determined that the black pixel clusters that have smaller sizes (minute isolated dots) are noise, and the black pixel clusters are removed. The noise removal may include a publicly known noise removal method (isolated point removal or the like).

Figure 5A:
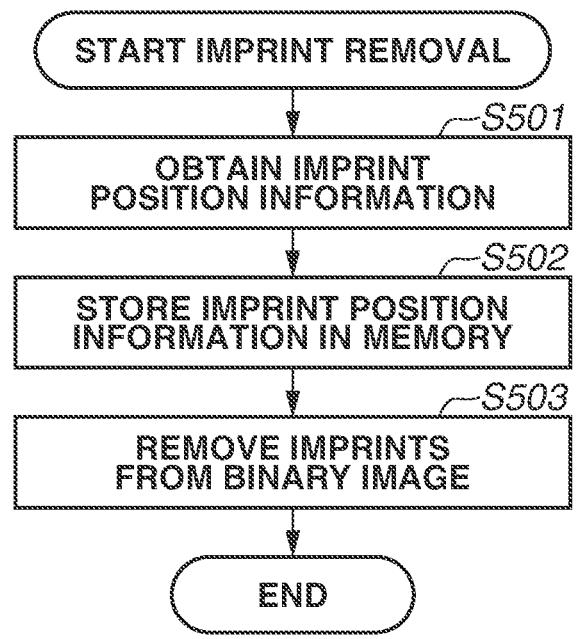
FIG. 5A is a flowchart that illustrates imprint removal processing according to the first exemplary embodiment.

Details of the imprint removal processing (step S302) will be described with reference to FIG. 5A. In step S501, the CPU 111 obtains imprint position information. Red pixel clusters in an input image are detected. Among the detected red pixel clusters, pixel clusters that have shapes and sizes of normal imprints are identified as imprints, and thus positions of the imprints are obtained for imprint position information. A method of obtaining imprint position information is not limited to the example, but another method may be used. In step S502, the CPU 111 stores the obtained imprint position information in the RAM 113 or the HDD 114. Then in step S503, the CPU 111 uses the stored imprint position information to convert pixels that correspond to imprints in a binary image into white pixels, and thus removes imprint images.

Figure 5B:
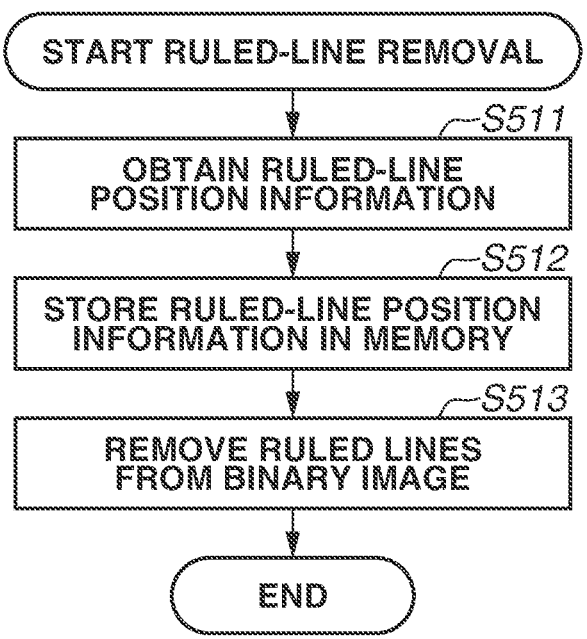
FIG. 5B is a flowchart that illustrates ruled-line removal processing according to the first exemplary embodiment.

Details of the ruled-line removal processing (step S303) will be described with reference to FIG. 5B. In step S511, the CPU 111 obtains ruled-line position information. For example, a histogram is created in each of a vertical direction and a lateral direction in a binary image. It is determined that vertical ruled lines and lateral ruled lines exist at positions where a counting number of the histogram becomes larger than or equal to a predetermined threshold. A method of detecting ruled lines is not limited to a method using the histogram, but another method may be used. In step S512, the CPU 111 stores the obtained ruled-line position information in the RAM 113 or the HDD 114. Then in step S513, the CPU 111 uses the stored ruled-line position information to convert pixels that correspond to ruled lines in a binary image into white pixels, and thus removes the ruled lines.

In the present exemplary embodiment, imprint position information at a time of imprint removal (step S302) and ruled-line position information at a time of ruled-line removal (step S303) are stored in different areas in the RAM 113 or the HDD 114. However, storage areas are not limited to the example. For example, positions of pixels that have been determined to be noise, imprints, ruled lines, and other non-character information may be stored in the same area.

In step S203, the CPU 111 uses the first threshold VTH used for the binarization processing in step S201 and a second threshold (p×VMAX) that is higher than the first threshold VTH to create a second binary image (hereinafter referred to as a high-luminance image) in which pixels of an input image that have luminance that is between the first threshold VTH and the second threshold (p×VMAX) have been made to be black pixels. That is to say, in a luminance image of an input image, pixels that have luminance values V that satisfy $$VTH < V \leq p \times VMAX \quad \text{(Expression 1)}$$

are made to be black pixels. The other pixels are made to be white pixels. Consequently, a high-luminance image is created.

VMAX is a maximum luminance value in an input image. In the present exemplary embodiment, 0.98 is used as the coefficient p.

The coefficient p is not limited to 0.98. A value of the coefficient p may be varied within a range that satisfies $$VTH/VMAX < p < 1.0 \quad \text{(Expression 2).}$$

Consequently, in a high-luminance image generated in step S203, pixels that have luminance that is higher than a threshold at a time of binarization processing in step S201 and have luminance that is lower than luminance of a background color are made to be black pixels, and the other pixels (pixels that have lower luminance and background pixels) are made to be white pixels. Note that the larger a value of the coefficient p is, the larger the number of pixels that satisfy Expression 1 is, and more likely unnecessary noise is extracted. Therefore, noise removal processing, such as isolated-point removal, may be performed in a high-luminance image. Further, density nonuniformity occurs in many high-luminance images. Therefore, processing that improves density nonuniformity, such as smoothing processing, may be preliminarily performed.

In step S204, the CPU 111 analyzes the high-luminance image to extract areas in which characters that have high luminance may exist (hereinafter referred as high-luminance image areas). For example, in a high-luminance image, black pixels that connect with each other are detected as black pixel clusters. An area where the detected black pixel clusters have a size that corresponds to a size of a normal character, and black pixel clusters that have similar sizes align is extracted as an area where a character string that has high luminance may exist (a high-luminance image area).

In step S205, the CPU 111 counts the number of the high-luminance image areas detected in step S204. In a case where at least one high-luminance image area exists (YES in step S205), the processing proceeds to step S206. In a case where no high-luminance image area exists (NO in step S205), the processing proceeds to step S209. In the processing from step S206 to step S208, the high-luminance image areas detected in step S204 is made to be a processing target one by one. The processing from step S206 to step S208 is repeated until all the high-luminance image areas are processed.

Figure 4:
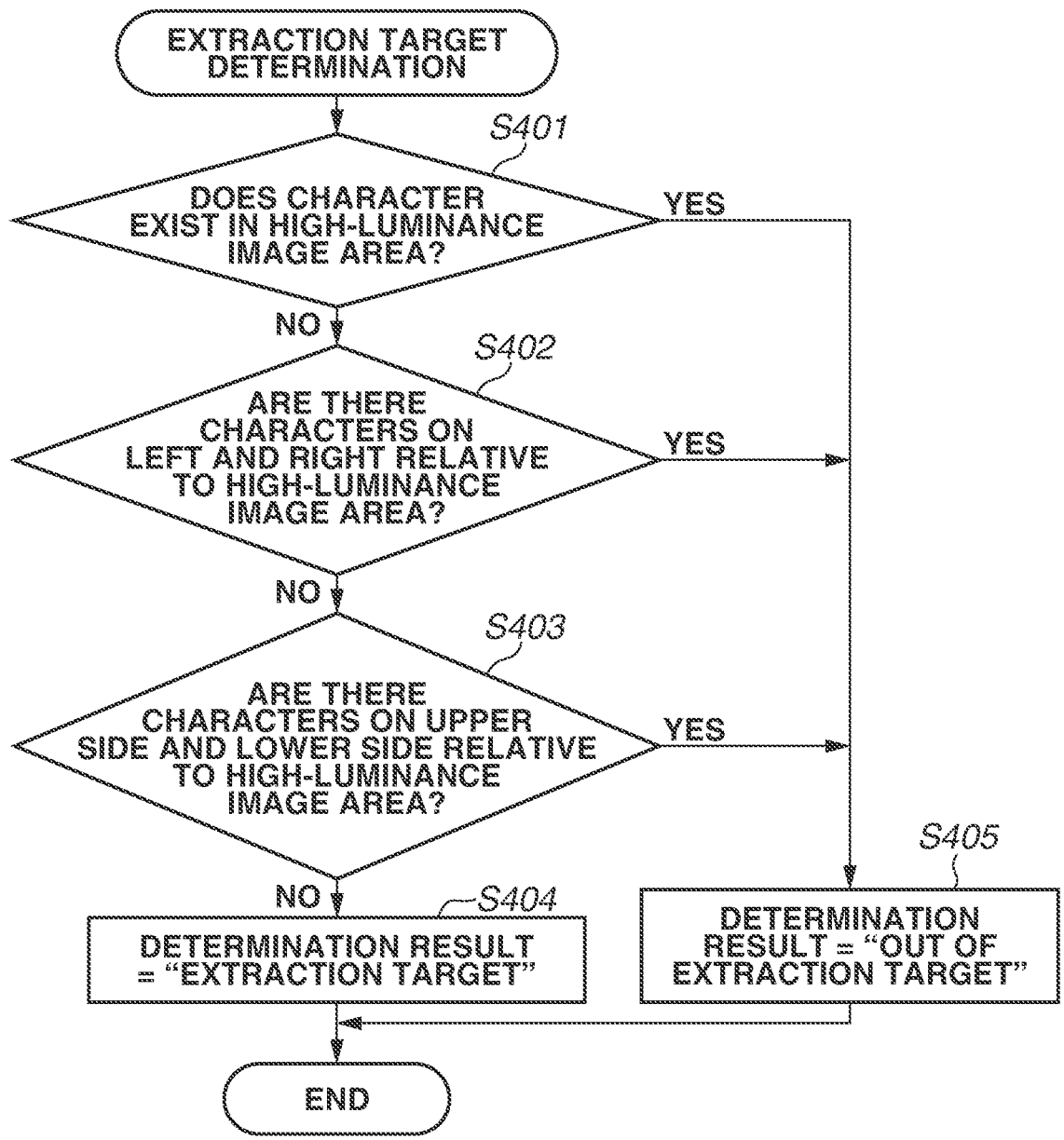
FIG. 4 is a flowchart that illustrates extraction target determination processing according to the first exemplary embodiment.

In step S206, the CPU 111 determines whether each of the high-luminance image areas will be made to be an extraction target. FIG. 4 illustrates a flowchart regarding extraction target determination processing for a high-luminance image, according to the first exemplary embodiment. First, in step S401, it is determined whether a black pixel cluster of a character image exists at a position that corresponds to a high-luminance image area that is a current processing target, in a binary image generated in step S201. If a position of a cluster of black pixels that have been determined to be character image pixels in step S202 is contained in a range that corresponds to a high-luminance image area that is a processing target, it is determined that a character exists in the high-luminance image area that is a processing target. In a case where it is determined that a character exists in a high-luminance image area (YES in step S401) (that is to say, in a case where a pixel cluster of a character extracted from a binary image overlaps a high-luminance image area extracted from a high-luminance image), there is a high possibility that the high-luminance image area is due to show-through. Therefore, the processing proceeds to step S405, and it is determined that the high-luminance image area that is a determination target is out of an extraction target. Alternatively, in a case where no character exists in a high-luminance image area (NO in step S401) (that is to say, in a case where a pixel cluster of a character extracted from a binary image does not overlap a high-luminance image area extracted from a high-luminance image), the processing proceeds to step S402.

Next, in step S402, the CPU 111 determines whether black pixel clusters of character images exist on both the left and the right relative to a position that corresponds to the high-luminance image area that is a determination target, in the binary image generated in step S201. If positions of clusters of a plurality of black pixels that have been determined to be character image pixels in step S202 exist on both the left and the right relative to a position that corresponds to a high-luminance image area that is a determination target, it is determined that characters exist on the left and the right relative to the high-luminance image area that is a determination target. In step S403, the CPU 111 determines whether black pixel clusters of character images exist on both the upper side and the lower side relative to a position that corresponds to the high-luminance image area that is a determination target, in the binary image generated in step S201. If positions of clusters of a plurality of black pixels that has been determined to be character image pixels in step S202 exist on both the upper side and the lower side relative to a position that corresponds to a high-luminance image area that is a determination target, it is determined that characters exist on the upper side and the lower side relative to the high-luminance image area that is a determination target. That is to say, in steps S402 and S403, it is determined whether a high-luminance image area exists between a plurality of black pixel clusters (in at least one of a right and left direction and an upper and lower direction) that has been determined to be character image pixels in a binary image.

In a case where a position of a high-luminance image area that is a determination target is not between a plurality of character images in a binary image (is not between pixel clusters of character images) (NO in step S402 and NO in step S403), there is a high possibility that the high-luminance image is a character image related to a Key or a Value. Even if a high-luminance image in the high-luminance image area is not a character image related to a Key or a Value, there is a low possibility that Key-Value extraction based on a character image in a binary image is hindered. Therefore, in step S404, the high-luminance image area that is a determination target is set to an extraction target, and position information about the high-luminance image area is stored in the RAM 113.

Alternatively, in a case where a position of a high-luminance image area that is a determination target is between a plurality of character images in a binary image (YES in step S402 or YES in step S403), if character images in the binary image have a relationship between a Key and a Value, extraction of a high-luminance image in the high-luminance image area between the plurality of character images may hinder Key-Value extraction. Therefore, in step S405, the high-luminance image area that is a determination target is set to out of an extraction target. In steps S402 and S403, the left and the right and the upper side and the lower side relative to a high-luminance image area are searched for existence of characters. However, the upper and lower search scope may be different from the left and right search scope. For example, with respect to the upper and lower direction, a scope that is within 180 pixels or is 180 pixels from an upper side of a high-luminance image area in an upper direction is searched for character images in a binary image, and a scope that is within 180 pixels or is 180 pixels from a lower side of the high-luminance image area in a lower direction is searched for character images in the binary image. On the other hand, with respect to the left and right direction, a space from a left side of the high-luminance image area to a left end in the binary image in the left direction and a space from a right side of the high-luminance image area to a right end in the binary image in the right direction are searched for character images. Further, a search scope may be varied depending on types of input images, or may be varied depending on sizes or positions of high-luminance image areas.

Next, in step S207, in a case where a determination result in step S206 is an "extraction target" (YES in step S207), the processing proceeds to step S208. Alternatively, in a case where a determination result is "out of an extraction target" (NO in step S207), it is determined whether a high-luminance image area that has not received a determination remains. In a case where there is a high-luminance image area that has not received a determination, the high-luminance image area is set to a new determination target, and the processing returns to step S206. In a case where all high-luminance image areas have received determinations, the processing proceeds to step S209.

Next, in step S208, the CPU 111 extracts position information about a black pixel cluster in the high-luminance image area that has been set to an extraction target in step S206, from the high-luminance image, and stores the position information in the RAM 113. After the processing in step S208, it is determined whether a high-luminance image area that has not received a determination remains. In a case where a high-luminance image area that has not received a determination remains, the high-luminance image area is set to a new determination target, and the processing returns to step S206. In a case where all high-luminance image areas have received determinations, the processing proceeds to step S209.

In step S209, the CPU 111 performs OCR processing (character recognition processing) on black pixel clusters of character images in the binary image and black pixel clusters of the high-luminance image in high-luminance image areas that have been set to extraction targets, and stores a character recognition result associated with position information, in the RAM 113 or the HDD 114. In the present exemplary embodiment, a characteristic amount of a character in a character area is analyzed, and the character is classified as a character that has the nearest characteristic amount, and thus the character in the character area is recognized. However, different methods may be used if characters in character areas can be recognized. For example, machine learning or deep learning may be used to recognize characters.

In step S210, the CPU 111 uses character recognition results stored in the RAM 113 or the HDD 114 to perform Key-Value extraction processing. In the present exemplary embodiment, information to search for Keys and Values is preliminarily stored in the HDD 114, and Keys and Values are extracted on the basis of character information of character recognition results and position information about each piece of the character information. Then each piece of the character information that has been determined to have a relationship between a Key and a Value is associated with position information, and each piece of the character information associated with the position information is stored in the RAM 113 or the HDD 114. The information for the search includes OCR results, forms of characters, or information regarding position relationships between Keys and Values. However, other information may be used if a similar effect can be obtained in Key-Value extraction.

Due to a configuration according to the first exemplary embodiment, appropriate black pixels among black pixels contained in a high-luminance image are set to extraction targets. Consequently, a high-luminance image that does not hinder Key extraction or Value extraction is extracted. Therefore, the accuracy of Key-Value extraction is improved.

Next, a second exemplary embodiment will be described. A difference between the second exemplary embodiment and the first exemplary embodiment will be described. Portions that are not clearly written have the same configuration and processes as the first exemplary embodiment.

In the first exemplary embodiment, a case where part or the whole of an imprint or a ruled line that has been removed from a binary image in non-character information removal (step S202) overlaps a high-luminance image area is not considered.

Figure 6:
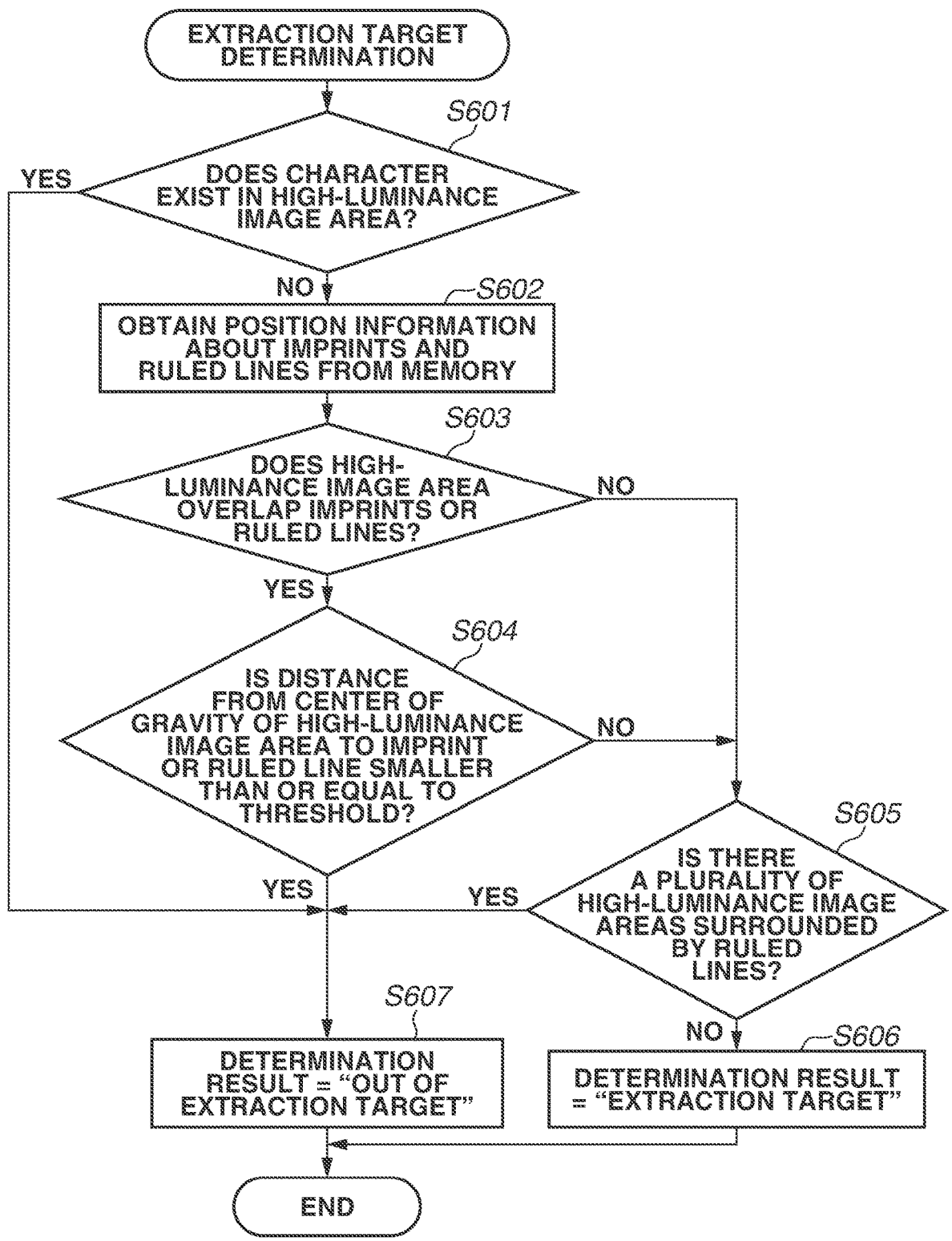
FIG. 6 is a flowchart that illustrates extraction target determination processing according to a second exemplary embodiment.

FIG. 6 illustrates a flowchart that illustrates extraction determination processing for a high-luminance image, according to the second exemplary embodiment. FIG. 6 is processing that corresponds to extraction determination processing (step S206 and FIG. 4) in the first exemplary embodiment. In step S601, a CPU 111 determines whether a black pixel cluster of a character image exists at a position that corresponds to a high-luminance image area that is a current processing target, in a binary image generated in step S201. In a case where it is determined that a character exists in a high-luminance image area (YES in step S601) (that is to say, in a case where a pixel cluster of a character extracted from a binary image overlaps a high-luminance image area extracted from a high-luminance image), there is a high possibility that the high-luminance image area is due to show-through. Therefore, the processing proceeds to step S607, and it is determined that the high-luminance image area that is a determination target is out of an extraction target. Alternatively, in a case where no character exists in a high-luminance image area (NO in step S601) (that is to say, in a case where a pixel cluster of a character extracted from a binary image does not overlap a high-luminance image area extracted from a high-luminance image), the processing proceeds to step S602.

In step S602, the CPU 111 obtains position information about imprints and ruled lines stored in a RAM 113 or a HDD 114 in steps S502 and S512.

Next, in step S603, the CPU 111 evaluates whether a high-luminance image area overlaps the position information about imprints or ruled lines. In a case where imprints or ruled lines overlap a high-luminance image area (YES in step S603), the processing proceeds to step S604. In a case where imprints or ruled lines do not overlap a high-luminance image area (NO in step S603), the processing proceeds to step S605.

In step S604, the CPU 111 calculates a shortest distance from coordinates of the center of gravity of a high-luminance image area to an imprint or a ruled line that has been determined to overlap the high-luminance image area. In a case where the shortest distance is smaller than or equal to a threshold (YES in step S604), the processing proceeds to step S607, and a high-luminance image in the high-luminance image area is set to out of an extraction target (that is to say, the high-luminance image is not displayed). Alternatively, if the shortest distance is larger than the threshold (NO in step S604), the processing proceeds to step S605. For example, if the threshold is one quarter of a size (height or width) of the high-luminance image area that is a determination target, it can be determined whether an imprint or a ruled line overlaps substantially the center of the high-luminance image area.

In step S605, first, the CPU 111 confirms whether the high-luminance image area that is a determination target is surrounded by ruled lines. Here, it is confirmed whether position information about ruled lines exists at a position that substantially coincides with a bounding rectangle (all upper, lower, left, and right sides) of the high-luminance image area. In a case where ruled lines exist, position information about the high-luminance image area that is a determination target is stored as a high-luminance image area surrounded by ruled lines, in another area of the RAM 113. Further, it is determined whether a plurality of high-luminance image areas surrounded by ruled lines aligns and exists at the same height. In a case where a plurality of high-luminance image areas surrounded by ruled lines exists (YES in step S605), in step S607, the high-luminance image areas are set to out of an extraction target because the high-luminance image areas are a colored background image of cells surrounded by ruled lines in a table. Alternatively, in a case where one high-luminance image area is surrounded by ruled lines, or in a case where high-luminance image areas close to a high-luminance image area have different heights (NO in step S605), in step S606, the high-luminance image area that is a determination target is set to an extraction target.

Due to the present exemplary embodiment, a high-luminance image area can be made to be out of an extraction target even in a case where part of an imprint or a ruled line overlaps substantially the center of the high-luminance image area.

Next, a third exemplary embodiment will be described. A difference between the third exemplary embodiment and the first and second exemplary embodiments will be described. Portions that are not clearly written have the same configuration and processes as the first and second exemplary embodiments.

In the first exemplary embodiment, a high-luminance image area is compared with position information about a character in a binary image to determine whether the high-luminance image area will be made to be an extraction target. However, in the present exemplary embodiment, on the basis of whether a high-luminance image is a character, it is determined whether a high-luminance image area will be made to be an extraction target. More specifically, an OCR result of a high-luminance image is used to determine a high-luminance image that should be made to be an extraction target and a back-side image that shows through and is not made to be an extraction target. To determine whether an image is a back-side image that shows through, two types of images that include a front-side image and a back-side image are used. However, in the present exemplary embodiment, with one type of image that is a front-side image, it can be determined whether an image is a back-side image that shows through.

FIG. 7A illustrates a flowchart that illustrates extraction target determination processing for a high-luminance image, according to the present exemplary embodiment. FIG. 7A is processing that corresponds to extraction target determination processing (step S206 and FIG. 4) in the first exemplary embodiment. In step S701, a CPU 111 determines whether a black pixel cluster of a character image exists at a position that corresponds to a high-luminance image area that is a current processing target, in a binary image generated in step S201. The processing in step S701 is similar to the processing in step S401.

In step S702, the CPU 111 uses a high-luminance image created in step S203, and performs OCR processing on a high-luminance image in the high-luminance image area that is a determination target. In the present exemplary embodiment, OCR processing is used to determine whether an image can be recognized as a character. However, other methods (for example, a neural network for character determination) may be used if an appearance like a character can be determined.

In step S703, the CPU 111 calculates a ratio of pixel clusters recognized as characters in all pixel clusters in the high-luminance image area that is a determination target (a ratio of pixel clusters that have degrees of certainty of OCR results that are larger than or equal to a predetermined value).

In step S704, the CPU 111 confirms whether a ratio of pixel clusters recognized as characters is larger than a threshold. In a case where a ratio of pixel clusters recognized as characters is larger than the threshold (YES in step S704), it is determined that the high-luminance image contains character images, the processing proceeds to step S705, and the high-luminance image area is set to an extraction target. Alternatively, in a case where a ratio of pixel clusters recognized as characters is smaller than or equal to the threshold (NO in step S704), i.e., it is recognized that the high-luminance image contains characters, there is a high possibility that the high-luminance image in the high-luminance image area is noise or a back-side image that shows through. Therefore, the processing proceeds to step S706, and the high-luminance image area is made to be out of an extraction target. In the present exemplary embodiment, a ratio of pixel clusters recognized as characters is a determination criterion. However, the number of pixel clusters recognized as characters may be used as a determination criterion.

Figure 7B:
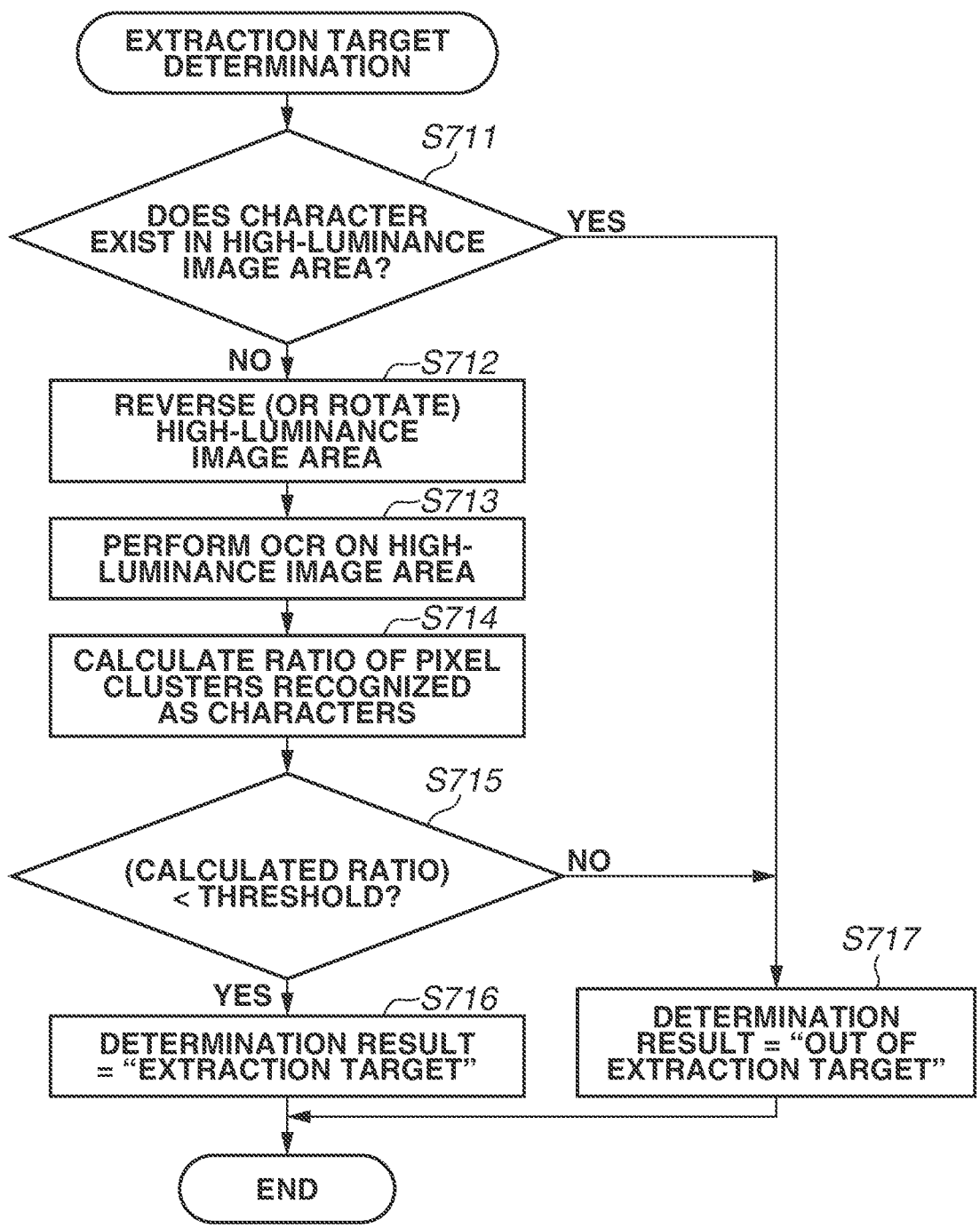
FIG. 7B is a flowchart that illustrates a variation example of extraction target determination processing according to the third exemplary embodiment.

FIG. 7B illustrates a flowchart that illustrates extraction target determination processing for a high-luminance image area, and the extraction target determination processing is based on another method and according to the present exemplary embodiment. FIG. 7B is processing that corresponds to extraction determination processing (step S206 and FIG. 4) in the first exemplary embodiment. In step S711, a CPU 111 determines whether a black pixel cluster of a character image exists at a position that corresponds to a high-luminance image area that is a current processing target, in a binary image generated in step S201. The processing in step S711 is similar to the processing in step S401.

In step S712, the CPU 111 reverses the high-luminance image area that is a processing target to generate a reversed high-luminance image. A back-side image that shows through in a front side often has characters that are reversed upside down or left side right. Therefore, in step S713, OCR processing is performed on the reversed high-luminance image.

In step S714, the CPU 111 calculates a ratio of pixel clusters recognized as characters with the OCR processing in step S713 in all pixel clusters in the high-luminance image area that is a determination target (a ratio of pixel clusters that have degrees of certainty of OCR results that are larger than or equal to a predetermined value).

In step S715, the CPU 111 confirms whether a ratio of pixel clusters recognized as characters is smaller than a threshold. In a case where a ratio of pixel clusters recognized as characters in a reversed high-luminance image is larger than or equal to the threshold (NO in step S715), it is determined that the high-luminance image area is a backside character image that shows through, the processing proceeds to step S717, and the high-luminance image area is set to out of an extraction target. Alternatively, in a case where a ratio of pixel clusters recognized as characters in a reversed high-luminance image is smaller than the threshold (YES in step S715), the processing proceeds to step S716, and the high-luminance image area is set to an extraction target. In the present exemplary embodiment, an image that is a high-luminance image reversed left side right is used. However, an image reversed upside down or rotated 180 degrees may be used. Alternatively, a character recognition result of each of an image reversed upside down, an image reversed left side right, and an image rotated 180 degrees may be compared with a character recognition result of an original image. In a case where the original image has the highest character recognition rate, it may be determined that the original image is an extraction target.

Due to the present exemplary embodiment, in a case where on the basis of an OCR result, it is determined that an image is a back-side high-luminance image that shows through, a high-luminance image area is set to an area out of an extraction target. Therefore, extraction of a high-luminance image that hinders Key-Value extraction is not allowed.

Next, a fourth exemplary embodiment will be described. A difference between the fourth exemplary embodiment and the first exemplary embodiment will be described. Portions that are not clearly written have the same configuration and processes as the first exemplary embodiment.

Figure 8:
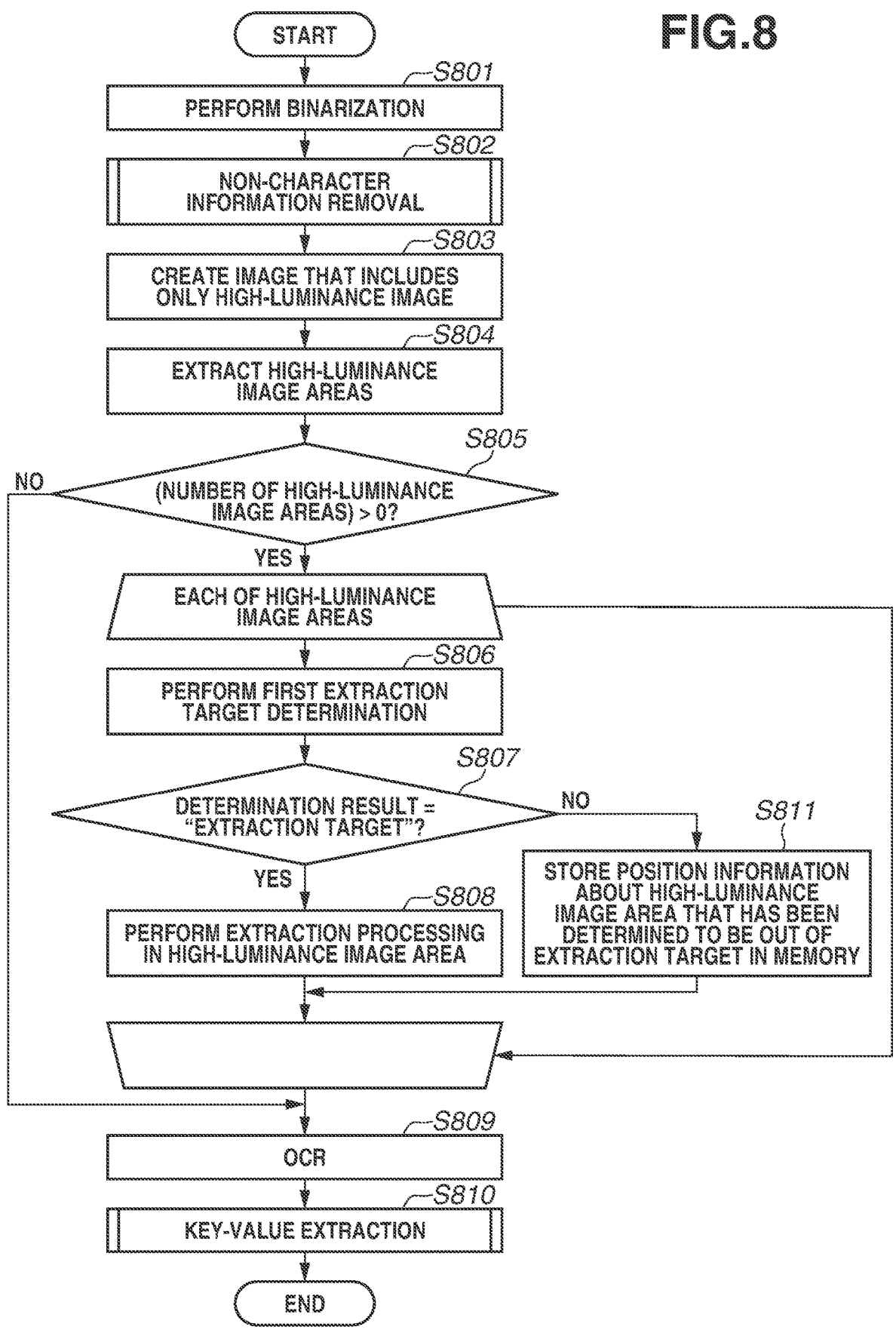
FIG. 8 is a flowchart that illustrates processing that is from binarization to Key-Value extraction, and is according to a fourth exemplary embodiment.

FIG. 8 illustrates a flowchart that illustrates a series of processing that is from binarization to Key-Value extraction processing, and is according to the present exemplary embodiment. In the flowchart in FIG. 8, steps S801 to S810 have processing content similar to that of steps S201 to S210 in the flowchart in FIG. 2. However, in a case where it is determined that a high-luminance image area is out of an extraction target (NO in step S807), the processing proceeds to step S811. In step S811, a CPU 111 stores position information about the high-luminance image area that has been determined to be out of an extraction target in a RAM 113 or an HDD 114.

Figure 9:
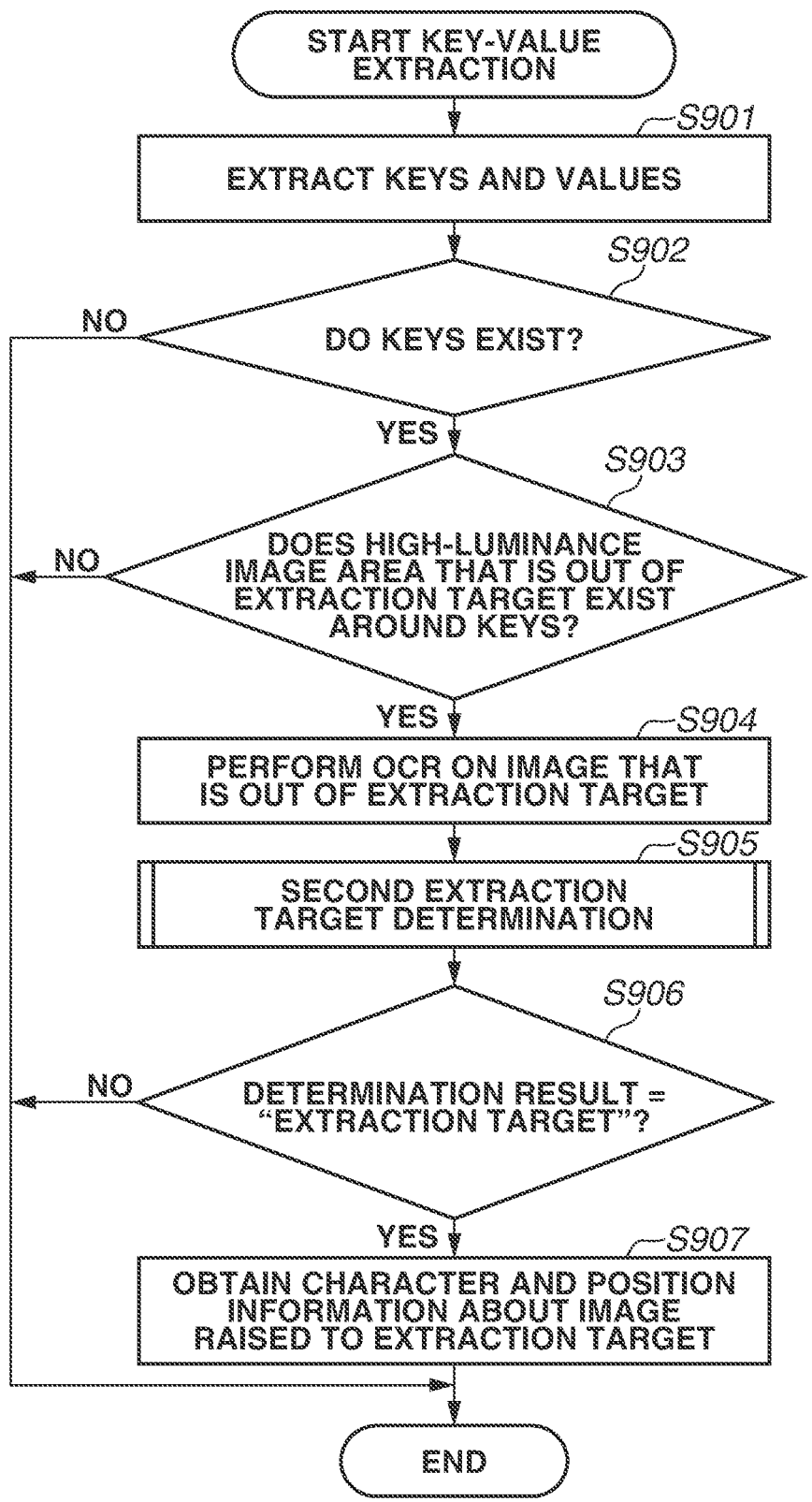
FIG. 9 is a flowchart that illustrates Key-Value extraction processing according to the fourth exemplary embodiment.

FIG. 9 illustrates a flowchart that illustrates details of Key-Value extraction processing in step S810 according to the present exemplary embodiment. In step S901, the CPU 111 extracts Keys and Values on the basis of an OCR result in step S809 (a result of OCR performed on black pixel clusters of character images in a binary image and black pixel clusters of a high-luminance image in a high-luminance image area that has been set to an extraction target) and the position information. Then each piece of character information that has been determined to have a relationship between a Key and a Value is associated with position information about the piece of character information. Each piece of the character information associated with position information about the piece of the character information is stored in the RAM 113.

Next, in step S902, the CPU 111 confirms whether Keys have been extracted. In a case where Keys have been extracted (YES in step S902), the processing proceeds to step S903. In a case where no Key has been extracted (NO in step S902), the processing ends.

Next, in step S903, the CPU 111 obtains position information about the extracted Keys from the RAM 113, and confirms whether a high-luminance image area that is out of an extraction target and has been stored in the RAM 113 in step S711 exists around the Keys. In a case where a high-luminance image area that has been made to be out of an extraction target in step S711 exists around the Keys (YES in step S903), the processing proceeds to step S904. In a case where a high-luminance image area that has been made to be out of an extraction target in step S711 does not exist around the Keys (NO in step S903), the processing ends. In the present exemplary embodiment, it is confirmed whether a high-luminance image area that has been made to be out of an extraction target exists around each of Keys. However, it may be additionally confirmed whether a high-luminance image area that has been made to be out of an extraction target exists around Values extracted in step S901.

In step S904, the CPU 111 performs OCR on a high-luminance image in a high-luminance image area that is out of an extraction target and has been determined to exist around a Key in step S903, and stores a character recognition result associated with position information in the RAM 113 or the HDD 114.

Figure 10:
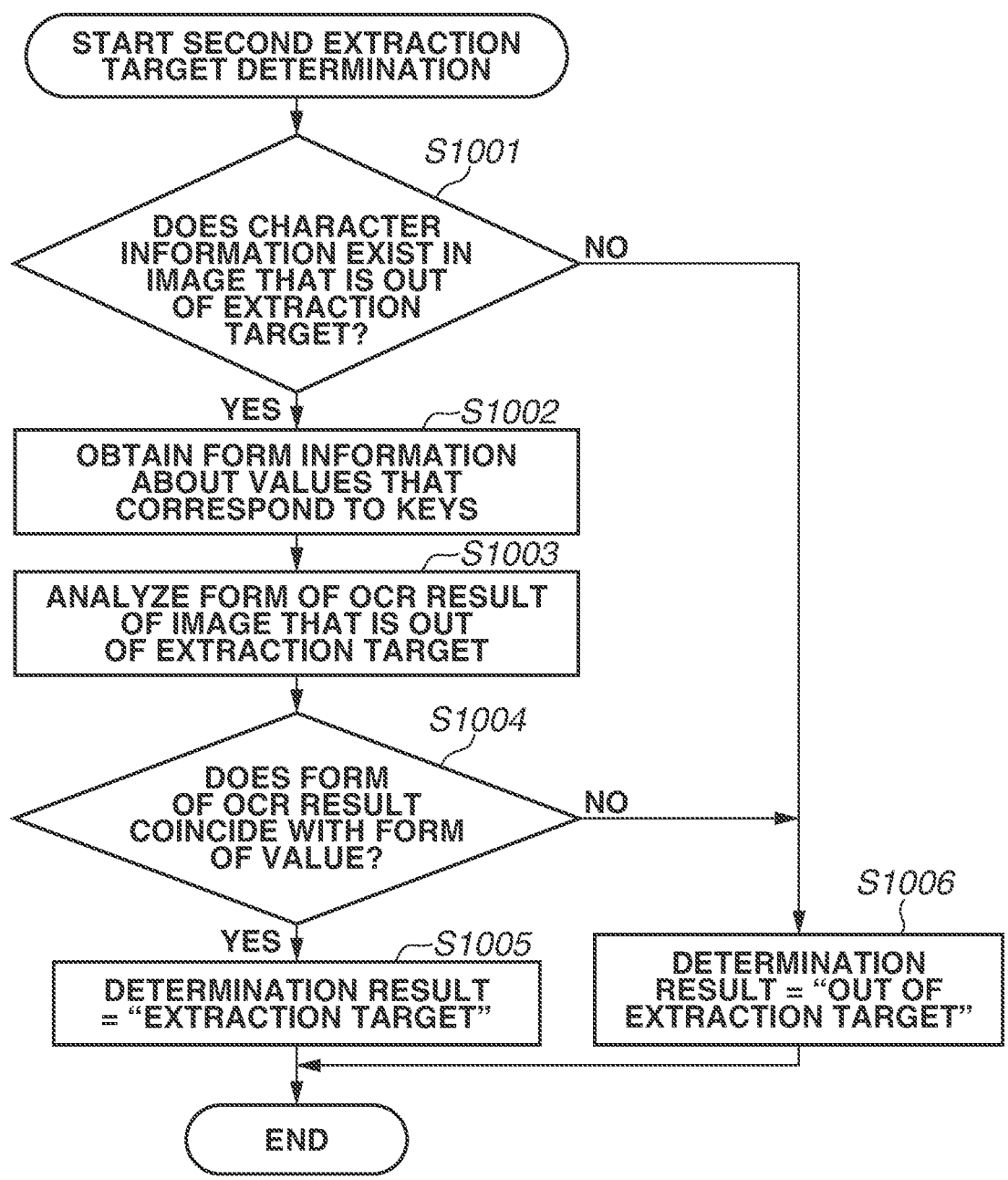
FIG. 10 is a flowchart that illustrates second extraction determination processing according to the fourth exemplary embodiment.

Next, in step S905, on the basis of an OCR result in step S904, the CPU 111 determines whether a high-luminance image in a high-luminance image area that is around a Key and has been set to out of an extraction target is a Value that corresponds to the Key. FIG. 10 illustrates a flowchart regarding Value determination processing according to the present exemplary embodiment. In step S1001, the CPU 111 confirms whether character information exists in a high-luminance image that exists around a Key and is out of an extraction target. In a case where character information exists (YES in step S1001), the processing proceeds to step S1002. In a case where character information does not exist (NO in step S1001), in step S1006, it is determined that a high-luminance image is an image that is out of an extraction target.

In step S1002, the CPU 111 obtains information that is regarding forms of Values that correspond to Keys and has been preliminarily stored in the HDD 114. In the present exemplary embodiment, in a case where a Key is, for example, a "money amount", "currency+number", "only number", or the like is used as a form of a corresponding Value. However, other writing methods may be used if a similar result is obtained.

In step S1003, the CPU 111 analyzes a form of a character on the basis of an OCR result of a high-luminance image that exists around a Key and is out of an extraction target. In step S1004, the CPU 111 determines whether a form of a character that is an analysis result of the OCR result of the high-luminance image coincides with a form of a character that has been preliminarily defined as a Value that corresponds to the Key. Then in a case where the CPU 111 determines that a form of a character that is an analysis result of the OCR result of the high-luminance image coincides with a form of a character that has been preliminarily defined as a Value that corresponds to the Key (YES in step S1004), the processing proceeds to step S1005, and the high-luminance image area is reset to an extraction target. Alternatively, in a case where the CPU 111 determines that a form of a character that is an analysis result of the OCR result of the high-luminance image does not coincide with a form of a character that has been preliminarily defined as a Value that corresponds to the Key (NO in step S1004), the processing proceeds to step S1006, and the high-luminance image area is made to remain out of an extraction target.

In step S906, the CPU 111 determines whether there is a high-luminance image area that has been reset to an extraction target as a result of a determination in step S905. In a case where there is a high-luminance image area that has been reset to an extraction target (YES in step S906), the processing proceeds to step S907. In step S907, the CPU 111 obtains position information and character information regarding the high-luminance image area that has been reset to an extraction target, and stores the position information and the character information that are associated with the Key in another area in the RAM 113 or the HDD 114. In a case where it is determined that there is no high-luminance image area that has been reset to an extraction target (NO in step S906), the Key-Value extraction ends.

Due to the present exemplary embodiment, Values contained in a high-luminance image that is out of an extraction target are obtained, and the accuracy of Key-Value extraction is further improved.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-116595, filed Jul. 6, 2020, which is hereby incorporated by reference herein in its entirety.

What is claimed is:

1. An apparatus comprising:
at least one memory that stores instructions; and
at least one processor that executes the instructions to perform:
generating a first binary image from an input image by changing first pixels of the input image into first black pixels and changing second pixels of the input image into first white pixels, wherein luminances of the first pixels are lower than a first threshold, and wherein the second pixels are other than the first pixels in the input image;
identifying character images from the first black pixels in the first binary image;
generating a second binary image from the input image by changing third pixels of the input image into second black pixels and changing fourth pixels of the input image into second white pixels, wherein luminances of the third pixels are higher than the first threshold and are lower than luminance of a background in the input image, wherein the second binary image is generated from the input image without using the generated first binary image;
determining whether each of black pixel clusters detected based on the second black pixels that connect with each other in the second binary image is a target, wherein the detected black pixel clusters include at least one of a first black pixel cluster, a second black pixel cluster and a third black pixel cluster,
wherein it is determined that the first black pixel cluster in the second binary image is the target in a case where a position of an area of the first black pixel cluster in the second binary image does not overlap a position of any area of the identified character images in the first binary image and where the position of the area of the first black pixel cluster in the second binary image is not between positions of any two areas of the identified character images in the first binary image,
wherein it is determined that the second black pixel cluster in the second binary image is not the target in a case where a position of an area of the second black pixel cluster in the second binary image overlaps a position of any area of the identified character images in the first binary image, and
wherein it is determined that the third black pixel cluster in the second binary image is not the target in a case where the position of the area of the third black pixel cluster in the second binary image is between positions of any two areas of the identified character images in the first binary image; and
performing character recognition processing on the identified character images and the first black pixel cluster that has been determined to be the target.

2. The apparatus according to claim 1, wherein the at least one processor executes the instructions to further perform: extracting character information that has a relationship between a Key and a Value, based on a result of the performed character recognition processing.

3. The apparatus according to claim 1,
wherein the detected black pixel clusters further include a fourth black pixel cluster, and
wherein in a case where a position of an area of the fourth black pixel cluster in the second binary image overlaps a position of an area of a non-character image that has been identified from the first black pixels in the first binary image, it is determined that the fourth black pixel cluster in the second binary image is not the target.

4. The apparatus according to claim 3, wherein ruled lines in the first binary image are identified as the non-character image.

5. A method comprising:

generating a first binary image from an input image by changing first pixels of the input image into first black pixels and changing second pixels of the input image into first white pixels, wherein luminances of the first pixels are lower than a first threshold, and wherein the second pixels are other than the first pixels in the input image;

identifying character images from the first black pixels in the first binary image;

generating a second binary image from the input image by changing third pixels of the input image into second black pixels and changing fourth pixels of the input image into second white pixels, wherein luminances of the third pixels are higher than the first threshold and are lower than luminance of a background in the input image, wherein the second binary image is generated from the input image without using the generated first binary image;

determining whether each of black pixel clusters detected based on the second black pixels that connect with each other in the second binary image is a target, wherein the detected black pixel clusters include a first black pixel cluster, a second black pixel cluster and a third black pixel cluster, wherein it is determined that the first black pixel cluster in the second binary image is the target in a case where a position of an area of the first black pixel cluster in the second binary image does not overlap a position of any area of the identified character images in the first binary image and where the position of the area of the first black pixel cluster in the second binary image is not between positions of any two areas of the identified character images in the first binary image, wherein it is determined that the second black pixel cluster in the second binary image is not the target in a case where a position of an area of the second black pixel cluster in the second binary image overlaps a position of any area of the identified character images in the first binary image, and wherein it is determined that the third black pixel cluster in the second binary image is not the target in a case where the position of the area of the third black pixel cluster in the second binary image is between positions of any two areas of the identified character images in the first binary image; and performing character recognition processing on the identified character images and the first black pixel cluster that has been determined to be the target.

6. A non-transitory computer-readable storage medium storing instructions that cause a computer to perform:

generating a first binary image from an input image by changing first pixels of the input image into first black pixels and changing second pixels of the input image into first white pixels, wherein luminances of the first pixels are lower than a first threshold, and wherein the second pixels are other than the first pixels in the input image;

identifying character images from the first black pixels in the first binary image;

generating a second binary image from the input image by changing third pixels of the input image into second black pixels and changing fourth pixels of the input image into second white pixels, wherein luminances of the third pixel are higher than the first threshold and are lower than luminance of a background in the input image, wherein the second binary image is generated from the input image without using the generated first binary image;

determining whether each of black pixel clusters detected based on the second black pixels that connect with each other in the second binary image is a target wherein the detected black pixel clusters include at least one of a first black pixel cluster, a second black pixel cluster and a third black pixel cluster, wherein it is determined that the first black pixel cluster in the second binary image is the target in a case where a position of an area of the first black pixel cluster in the second binary image does not overlap a position of any area of the identified character images in the first binary image and where the position of the area of the first black pixel cluster in the second binary image is not between positions of any two areas of the identified character images in the first binary image, wherein it is determined that the second black pixel cluster in the second binary image is not the target in a case where a position of an area of the second black pixel cluster in the second binary image overlaps a position of any area of the identified character images in the first binary image, and wherein it is determined that the third black pixel cluster in the second binary image is not the target in a case where the position of the area of the third black pixel cluster in the second binary image is between positions of any two areas of the identified character images in the first binary image; and performing character recognition processing on the identified character images and the first black pixel cluster that has been determined to be the target.

* * * * *